(12) United States Patent
Song et al.

(10) Patent No.: US 10,532,873 B2
(45) Date of Patent: Jan. 14, 2020

(54) HAZARDOUS ARTICLE HANDING AND LOGISTICS INFORMATION SYSTEM FOR GEOLOGICAL SCIENCES AND OTHER PURPOSES

(71) Applicant: China University of Petroleum (East China), Qingdao (CN)

(72) Inventors: Ying Song, Qingdao (CN); Ying Qi, Qingdao (CN); Chenglin Cong, Tampa, FL (US); Andrei Stepashko, Khabarovsk (RU)

( * ) Notice: Subject to any disclaimer, the term of this patent is extended or adjusted under 35 U.S.C. 154(b) by 302 days.

(21) Appl. No.: 15/482,812

(22) Filed: Apr. 9, 2017

(65) Prior Publication Data

US 2017/0210537 A1 Jul. 27, 2017

Related U.S. Application Data

(63) Continuation of application No. PCT/CN2016/077557, filed on Mar. 28, 2016.

(30) Foreign Application Priority Data

Apr. 30, 2015 (CN) .......................... 2015 1 0214303

(51) Int. Cl.
*B65D 81/05* (2006.01)
*B65D 25/14* (2006.01)
(Continued)

(52) U.S. Cl.
CPC ............... *B65D 81/05* (2013.01); *A62D 3/30* (2013.01); *B65D 25/02* (2013.01); *B65D 25/14* (2013.01);
(Continued)

(58) Field of Classification Search
CPC ........ B65D 85/70; B65D 81/38; B65D 81/18; B65D 81/05; B65D 55/145; B65D 53/02;
(Continued)

(56) References Cited

U.S. PATENT DOCUMENTS

| | | | |
|---|---|---|---|
| 5,332,335 A | * | 7/1994 | Daul ...................... B65D 90/24 156/98 |
| 5,607,384 A | | 3/1997 | Caparros |

(Continued)

FOREIGN PATENT DOCUMENTS

CN 102616457 A 8/2012

OTHER PUBLICATIONS

International Search Report of PCT/CN2016/077557, dated Jun. 28, 2016.

*Primary Examiner* — Shogo Sasaki
(74) *Attorney, Agent, or Firm* — W&K IP

(57) ABSTRACT

Hazardous article handing and logistics information system for geological sciences and other purposes, comprising a liquid hazardous article logistics container (A), a Beidou satellite navigation system (B) and a remote control terminal (C). The liquid hazardous article logistics container consists of an outer protective sleeve (1), a liquid storage main body part (2), a main body outer cover part (3), a stabilizer storage mechanism (4), a main body base part (5), a control display part (6), a main body inner cover mechanism (7) and a neutralizer storage and releasing mechanism (8). Various liquid hazardous articles can be kept in a good storage environment, the whole logistics process is tracked and monitored in real time, and a liquid hazardous article logistics container can be controlled to release a neutralizer in an emergency.

1 Claim, 19 Drawing Sheets

(51) Int. Cl.
*A62D 3/30* (2007.01)
*B65D 25/02* (2006.01)
*B65D 25/20* (2006.01)
*B65D 43/02* (2006.01)
*B65D 53/02* (2006.01)
*B65D 55/14* (2006.01)
*B65D 81/18* (2006.01)
*B65D 81/38* (2006.01)
*B65D 85/00* (2006.01)
*E05B 17/22* (2006.01)
*E05B 49/00* (2006.01)
*G01S 19/13* (2010.01)
*H01R 24/64* (2011.01)
*H01R 107/00* (2006.01)

(52) U.S. Cl.
CPC ......... *B65D 25/20* (2013.01); *B65D 43/0225* (2013.01); *B65D 53/02* (2013.01); *B65D 55/145* (2013.01); *B65D 81/18* (2013.01); *B65D 81/38* (2013.01); *B65D 85/70* (2013.01); *E05B 17/226* (2013.01); *E05B 49/00* (2013.01); *G01S 19/13* (2013.01); *H01R 24/64* (2013.01); *B65D 2581/02* (2013.01); *H01R 2107/00* (2013.01)

(58) Field of Classification Search
CPC .... B65D 43/0225; B65D 25/20; B65D 25/02; A62D 3/30; G01S 19/13; G06Q 10/0832
See application file for complete search history.

(56) References Cited

U.S. PATENT DOCUMENTS

| 5,819,787 | A | * | 10/1998 | Caparros | F17C 7/00 137/377 |
| 6,684,899 | B2 | * | 2/2004 | Caparros | F16K 1/304 137/259 |
| 7,273,076 | B2 | * | 9/2007 | Franck | F17C 7/00 141/329 |
| 2013/0278067 | A1 | | 10/2013 | Poss | |

* cited by examiner

HAZARDOUS ARTICLE HANDING AND LOGISTICS INFORMATION SYSTEM FOR GEOLOGICAL SCIENCES AND OTHER PURPOSES

CROSS-REFERENCE TO RELATED APPLICATIONS

This application is a continuation of International Patent Application No. PCT/CN2016/077557 with a filing date of Mar. 28, 2016, designating the United States, now pending, and further claims priority to Chinese Patent Application No. 201510214303.8 with a filing date of Apr. 30, 2015. The content of the aforementioned application, including any intervening amendments thereto, are incorporated herein by reference.

TECHNICAL FIELD

The invention belongs to the transport of hazardous article field. It is a hazardous article handing and logistics information system for geological sciences and other purposes.

BACKGROUND OF THE PRESENT INVENTION

Chemicals are widely used in daily production and research activities. Some chemicals are hazardous during the usage, storage and transport processes. Frequent and unavoidable accidental leakage, disclosure, loss and other accidents not only pollute the natural environment, but also affect people's everyday life. Therefore, the appropriate storage environment and transport methods for chemicals, especially for liquid hazardous articles, can effectively prevent metamorphism and leakage of hazardous article substance during storage and transport, and can greatly reduce accidents like disclosure, combustion, explosion, corrosion, poisoning, etc. For the geological research, several types of solvents and corrosive chemicals are used in the geologic laboratory as diluents, oxidants, and metal extractants. They are used for chemical analyses, sample digestion, rock decomposition, and etching.

Existed storage and transport containers for liquid hazardous articles usually are made of glass, plastic and metal. However, the traditional containers do not have heating, refrigerating or heat preservation functions so that cannot provide a safe storage environment for some liquid hazardous articles, and stabilizers cannot be added to the chemicals according to their properties to maintain stability. During logistics, the storage and transport containers are not bulletproof, stab resistant, shockproof and anti-disclosure. The whole logistics process cannot be tracked, monitored and adjusted in real time. And the hazardous articles cannot be automatically neutralized in emergency with the aim of reducing environment pollution.

SUMMARY OF PRESENT INVENTION

A hazardous article handing and logistics information system for geological sciences and other purposes is invented to overcome the shortages of the current liquid hazardous article logistics system for the storage and transport of liquid hazardous articles. The logistics container is made of special material with corrosion resistant, bulletproof, shockproof, stab resistant and anti-theft functions. There is a specific stabilizer repository which can maintain the stability of hazardous articles by adding stabilizers to them. With the help of Beidou Satellite Navigation System, the hazardous article handing and logistics information system for geological sciences and other purposes can remotely track the position and monitor the state of hazardous articles in real time. Besides, in case of emergency, it can make directions to neutralize chemicals in emergency to avoid environment pollution because of Beidou's two-way message communication function.

The invention is designed to solve the above problems, and the technical schemes are as follows:

The hazardous article handing and logistics information system for geological sciences and other purposes basically comprises three parts: a liquid hazardous article logistics container, a Beidou Satellite Navigation System and a remote control terminal. The liquid hazardous article logistics container consists of an outer protective sleeve, a liquid storage main body, a main body outer lid, a stabilizer storage mechanism, a main body pedestal, a control display, a main body inner lid mechanism and a neutralizer storage and releasing mechanism:

The outer protective sleeve is consisted of an outer lining, rubber brackets, Absorb vibration leaf springs, Absorb vibration springs and an inner lining. The outer sleeve is wrapped up by the outer lining with zippers on it. Between the outer and inner linings, the rubber brackets are installed in the middle of the sleeve, with several slots in the circumferential direction and several pedestals at the bottom. The Absorb vibration leaf springs are evenly distributed in the slots, while the Absorb vibration springs are in the pedestal.

The liquid storage main body includes an inner tank, a soft hose, a shell, an auxiliary mount for heat preservation filler, heat preservation fillers, a temperature sensor, semiconductor-refrigerating chips, auxiliary mounting chips for refrigerating chips, an Absorb vibration spring and a liquid level sensor. With USB holes in the inner surface, the soft hose, which is made from material that is bulletproof, stab-resistant and shockproof, enwraps the shell. The shell enwrapping the inner tank is made of high strength special steel. There are mounting slots and holes for the sensor and its wires in the middle of the inner tank's bottom. Made from corrosion resistant material, the inner tank contains two layers. The gap between the two layers is filled with heat preservation filler. The auxiliary mount for heat preservation filler is made of soft rubber and installed at the bottom of the tank with threads. The Absorb vibration spring locates between the tank bottom and the mounting pedestal. The temperature sensor and the liquid level sensor are installed in the mounting holes at the bottom of the inner tank, sealed by sealing material and connected to the main control board through wires. The semiconductor-refrigerating chips are fixed in the mounting slot at the bottom of the inner tank, of which one side contacts to the outer surface of the inner tank bottom and the other side contacts to the auxiliary mounting chips for refrigerating chips, sealed by silicone and connected to the main control board through wires.

The main body outer lid has a Beidou positioning and communication module and an outer lid. The outer lid is installed on the top of plastic ring through pin shaft, with pin and wire holes on the one side, and buckle of code lock on the other side. Beidou positioning and communication module sets inside the outer lid and connects the main control board through wires. The outer lid is for the installation of Beidou module.

The stabilizer storage mechanism contains a stabilizer holder, a stabilizer box, a stabilizer locking ring and a fixed plate of stabilizer holder. The stabilizer holder is fixed in the mounting slot inside the inner tank bottom, with flow hole, mounting slot of stabilizer box and fixed plate and mounting hole of locking ring on the upper and lower surfaces. There are flow holes on the surrounding surfaces and at the bottom of the stabilizer box which is installed in the mounting slot of the holder by overhang flanges. The locking ring is fixed in the mounting holes in the middle of the holder and the fixed plate. The stabilizer holder fixed plate is installed in the mounting slot with its overhang cylinders fixed in the holder chute from both sides and the locking ring connected to the holder in the middle.

The main body pedestal consists of a mounting pedestal, a USB outlet, an emergency power supply, a main battery, a battery lid, a main control board and a drawer box and slide. The mounting pedestal is installed at the bottom of the tank with screw threads, with USB outlet on one side. At the bottom of it is the battery mounting slot, through which the USB outlet connects to the main control board. Between the auxiliary mount for heat preservation filler and the mounting pedestal is the Absorb vibration spring. The emergency power supply is installed on the mounting pedestal, connecting to the main control board through wires. The main battery is installed in the bottom of the mounting base of the battery installation slot, in its lower surface mounted with a battery cover, and through the wire connecting the main control board The main control board is fixed in the upper of the pedestal. The drawer box is fitted in the mounting slot in the middle of the mounting pedestal, while the drawer slide is in the chute around the mounting pedestal and the drawer box.

The control display covers a temperature display, a temperature up-regulated button, a temperature down-regulated button, a heat preservation button, a main switch, a refrigerating button, a heating button, a liquid volume display, code lock buttons, a mechanical keyhole of the code lock, a plastic ring, a code display and a code lock. Wherein the plastic ring is secured to the outside of the inner tank at the upper portion of the outer periphery of the top portion of the soft hose. There is a pin shaft hole on the upper of the ring, connecting the outer lid with the pin shaft, with wire holes on the connection. The mechanical lock is installed around the ring, and the temperature display, liquid volume display as well as the code display is on the outer edge of the plastic ring, connecting to the main control board through wires. Beneath the outer edge of the plastic ring are temperature up-regulated button, temperature down-regulated button, heat preservation button, main switch, refrigerating button, heating button and code lock buttons, which connect to the main control board through wires. The mechanical keyhole of the code lock exists centrally under the code display.

The main body inner lid mechanism is made up of a safety pin of the inner lid, a movable inner lid, a fixed inner lid, a gasket and a seal ring. The fixed inner lid is installed inside the upper of the inner tank by screw threads with three extraction solution holes and a safety locking hole on the top. The angular spacing between extraction solution holes are 60, 120 and 180 degrees respectively, with wire holes in the radial direction and two conductive rings inside its circumferential direction. The movable inner lid fits inside the fixed one with three extraction solution holes on the top. The angular spacing between extraction solution holes are 60, 120 and 180 degrees respectively. There is a mounting slot in the circumferential direction and a hollow mounting boss with tapered surface inside in the middle of the movable lid; there are wire holes on the boss as well. The safety pin is installed in the locking hole of the fixed inner lid and pressed against the upper surface of the gasket. The gasket is made of high-elastic corrosion-resistant material and the upper is provided with three extraction solution holes corresponding to the holes on the movable inner lid. On the upper surface of the movable inner lid, it locates between the fixed and the movable lids. The seal ring fits in the mounting slot in the circumferential direction of the movable lid.

The neutralizer storage release mechanism is composed of a rubber mounting pedestal, a return spring, a rubber block, a tablet, a neutralizer release spring, a neutralizer release lid, neutralizer release push rods, neutralizer release keepers and neutralizer release electromagnets. The rubber mounting pedestal is threaded connected to the inner lower of the boss in the middle of the movable inner lid, and a through hole is formed in the middle. The upper part thereof is provided with a tapered surface. The rubber block are molded by rubber casting, with four neutralizer release electromagnets evenly distributed on the upper surface and fits inside the mounting boss in the middle of the movable lid with outer inclined tapered surface outside, inner outward and inward inclined surface inside and space for neutralizer storage in the middle. The mounting slot for push rod is evenly distributed in the circumferential direction under the block. It is the same with four gaps which divide the lower into four sections molded by rubber casting, with a neutralizer release keeper in each section. The outer inclined tapered surface contacts with the inner tapered surface in the middle of the movable inner lid, while the inner inclined tapered surface contacts with the outer tapered surface of the rubber mounting pedestal. The return spring is placed between the upper surface of the rubber mounting pedestal and the lower surface of the rubber block. The tablet sets between the movable inner lid and the top of the rubber block, with mounting slot and elastic seal ring in the circumferential direction. Made from elastic material, the neutralizer release lid is fitted in the space where the neutralizer is stored in the middle of the rubber block. On the upper of it evenly distribute four overhang flanges which are installed on the top of the push rod mounting slot of the rubber block. Inside the release lid, the neutralizer release spring is between it and the rubber block. The neutralizer release push rods are fixed in the push rod mounting slot of the rubber block; its upper surface and lower surface contact the tapered surface of neutralizer release lid's overhang flange and the bottom of the rubber mounting pedestal's tapered surface.

Advantages of the invention: the hazardous article handing and logistics information system for geological sciences and other purposes of this invention is mostly used for storing high-precision liquid chemicals and hazardous articles: regulate the hazardous articles remotely, has multi-functions like positioning, heating, refrigerating and heat preservation, monitor the temperature and liquid volume in real time and automatically and quickly neutralize them in case of emergency to avoid chemical leakage and environment pollution. Based on China's Beidou Satellite Navigation System with IPR and the both-direction and short-message communicating technique, it does not rely on foreign technology and GPRS, and works without the influence of location and natural disasters. It has benefited the storage and transport of industrial hazardous articles to a certain extent.

ORDER NUMBER

A. liquid hazardous article logistics container, B. Beidou Satellite Navigation System, C. remote control terminal;
1. outer protective sleeve, 2. liquid storage main body, 3. main body outer lid, 4. stabilizer storage mechanism, 5. main body pedestal, 6. control display, 7. main body inner lid mechanism, 8. neutralizer storage and releasing mechanism
1.1. outer lining, 1.2. rubber bracket, 1.3. Absorb vibration leaf spring, 1.4. Absorb vibration spring, 1.5. inner lining, 2.1. inner tank, 2.2. soft hose, 2.3. shell, 2.4. auxiliary mount for heat preservation filler, 2.5. heat preservation filler, 2.6. temperature sensor, 2.7. semiconductor-refrigerating chips, 2.8. auxiliary mounting chips for refrigerating chips, 2.9. Absorb vibration spring. 2.10. liquid level sensor, 3.1. Beidou positioning and communication module, 3.2. outer lid, 4.1. stabilizer holder, 4.2. stabilizer box, 4.3. stabilizer locking ring. 4.4. retainer plate of stabilizer holder, 5.1. mounting pedestal, 5.2. USB outlet, 5.3. emergency power supply, 5.4. main battery, 5.5. battery lid, 5.6. main control board, 5.7. drawer box, 5.8. drawer slide, 6.1. temperature display, 6.2. temperature up-regulated button, 6.3. temperature down-regulated button, 6.4. heat preservation button, 6.5. main switch, 6.6. refrigerating button, 6.7. heating button, 6.8. liquid volume display, 6.9. code lock buttons, 6.10. mechanical keyhole of the code lock, 6.11. plastic ring, 6.12 code display, 6.13. code lock outer lid, 7.1. safety pin of the inner lid, 7.2. movable inner lid, 7.3. fixed inner lid. 7.4. gasket, 7.5. seal ring, 8.1. rubber mounting pedestal, 8.2. return spring, 8.3. rubber block, 8.4. tablet, 8.5. neutralizer release spring, 8.6. neutralizer release lid, 8.7. neutralizer release push rods. 8.8. neutralizer release keepers, 8.9. neutralizer release electromagnets:
1.1.1. outer sleeve zipper, 3.2.1 pinhole of outer lid, 3.2.2 retaining ring of code lock. 8.3.1. mounting slot of push rod, 8.3.2. inner outward tapered surface, 8.3.3. inner inclined tapered surface, 8.3.4. outer inclined tapered surface, 8.6.1. overhang mounting flange.

DETAILED DESCRIPTION OF PREFERRED EMBODIMENTS

Figure 1:
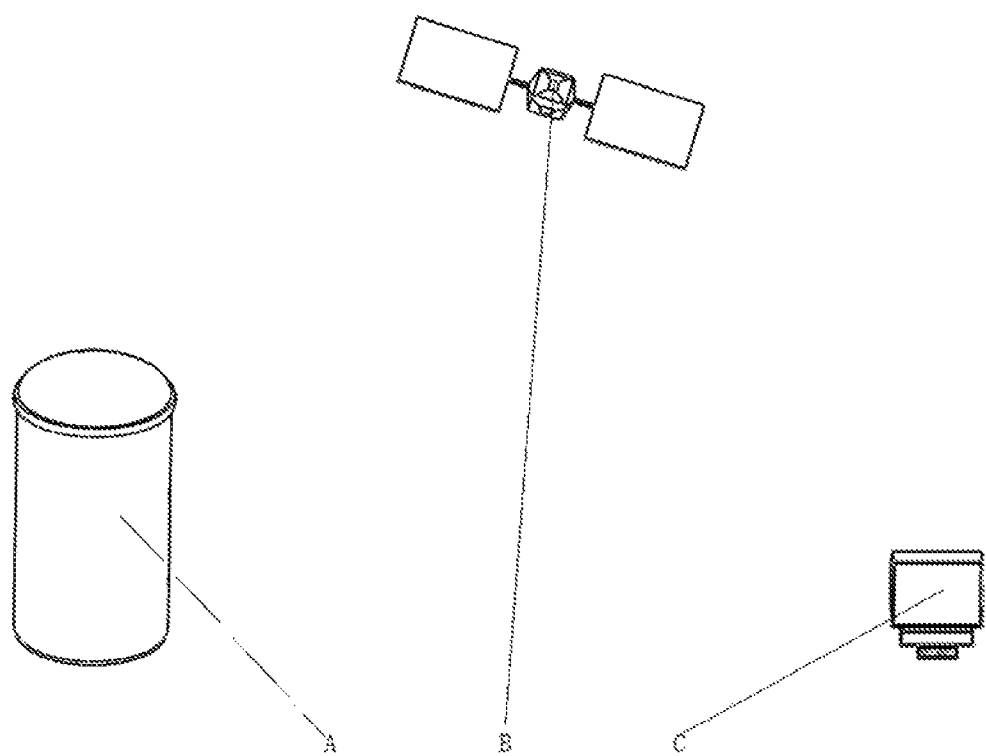
FIG. 1 is a schematic diagram of the present invention—a hazardous article handing and logistics information system for geological sciences and other purposes.
Figure 2:
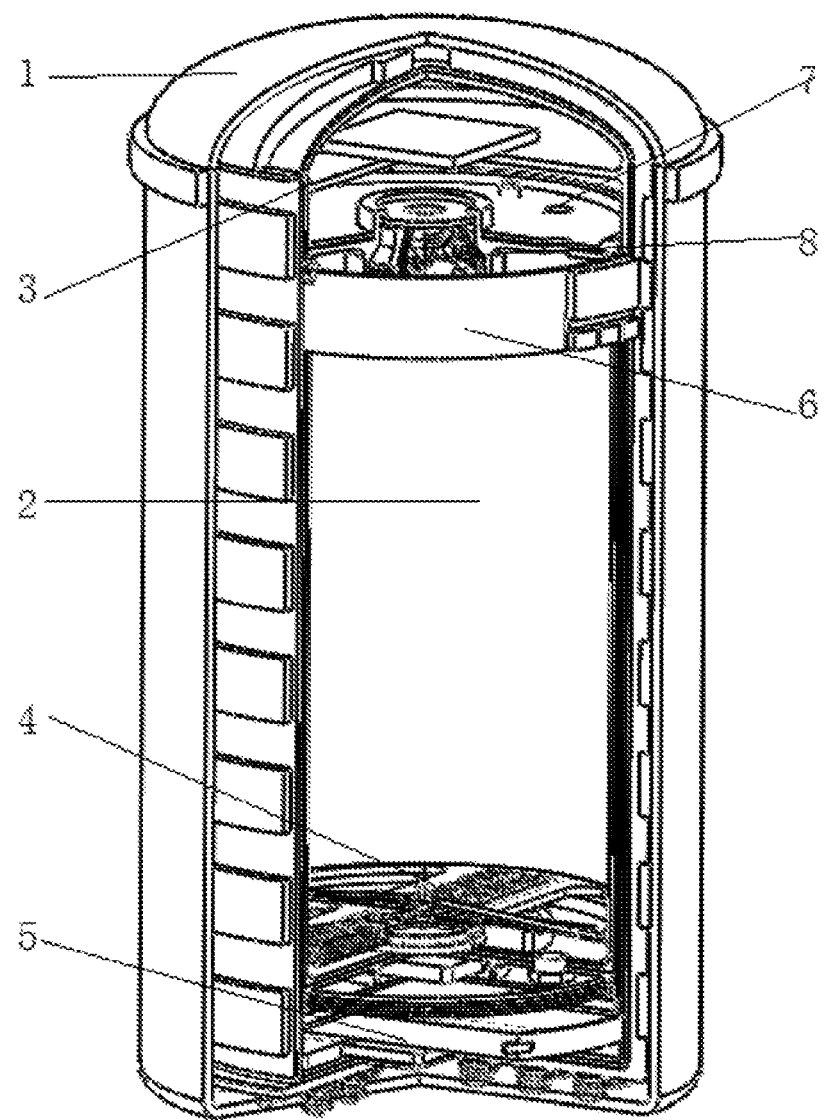
FIG. 2 is a schematic diagram of the liquid hazardous article logistics container to the present invention.
Figure 3:
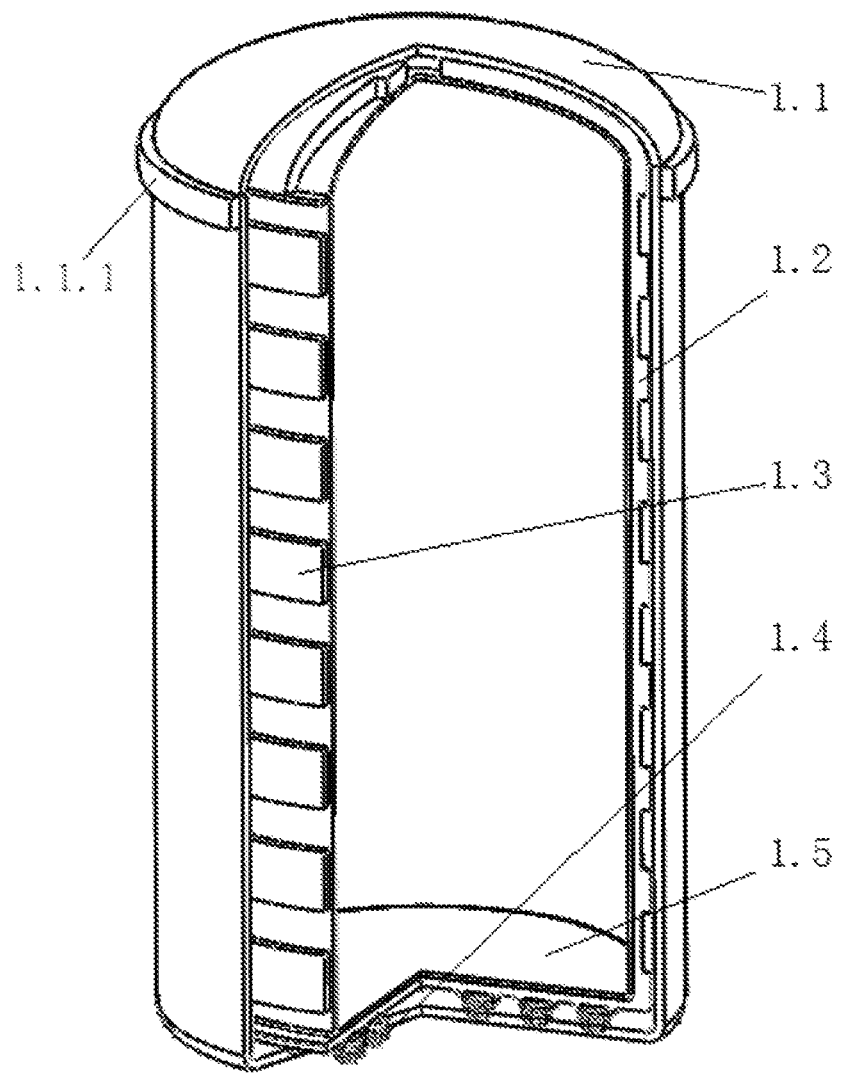
FIG. 3 is a schematic diagram of the outer protective sleeve to the present invention.
Figure 4:
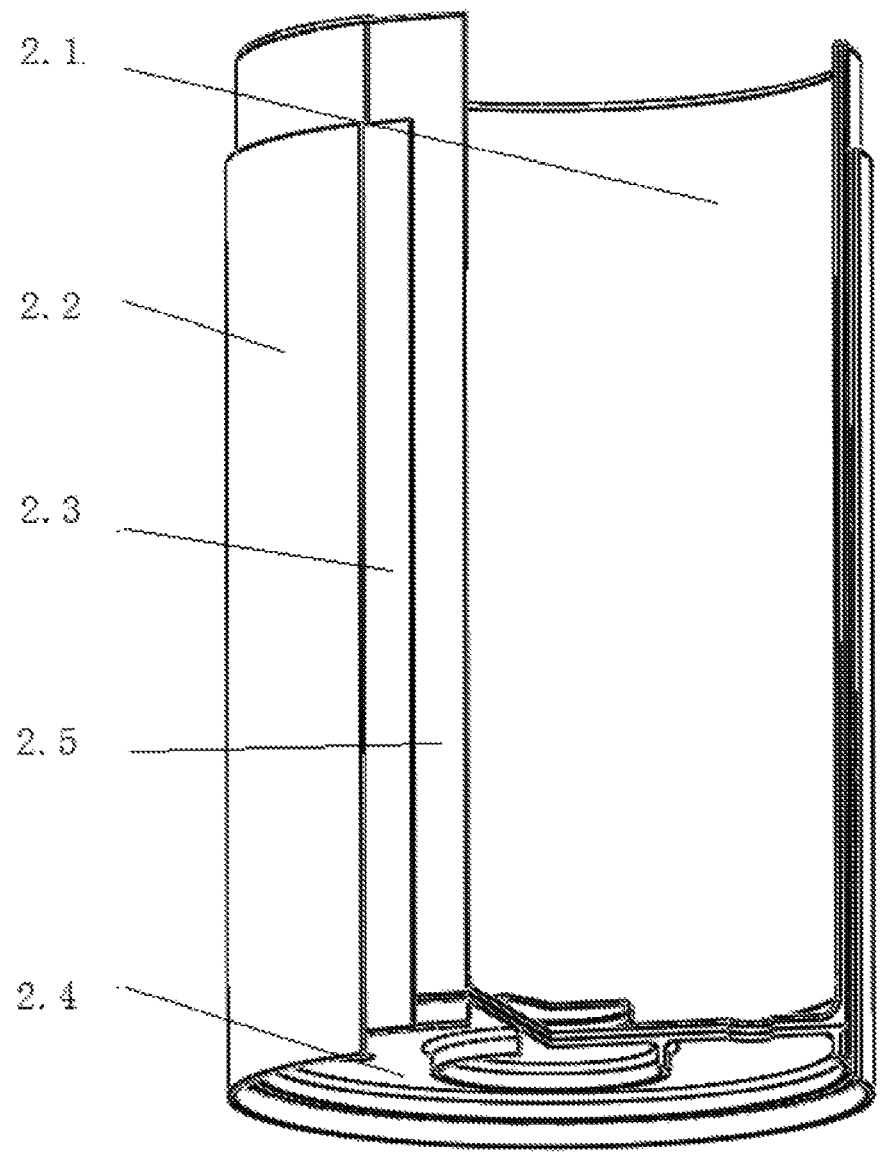
FIG. 4 is a schematic diagram of the liquid storage main body to the present invention.
Figure 5:
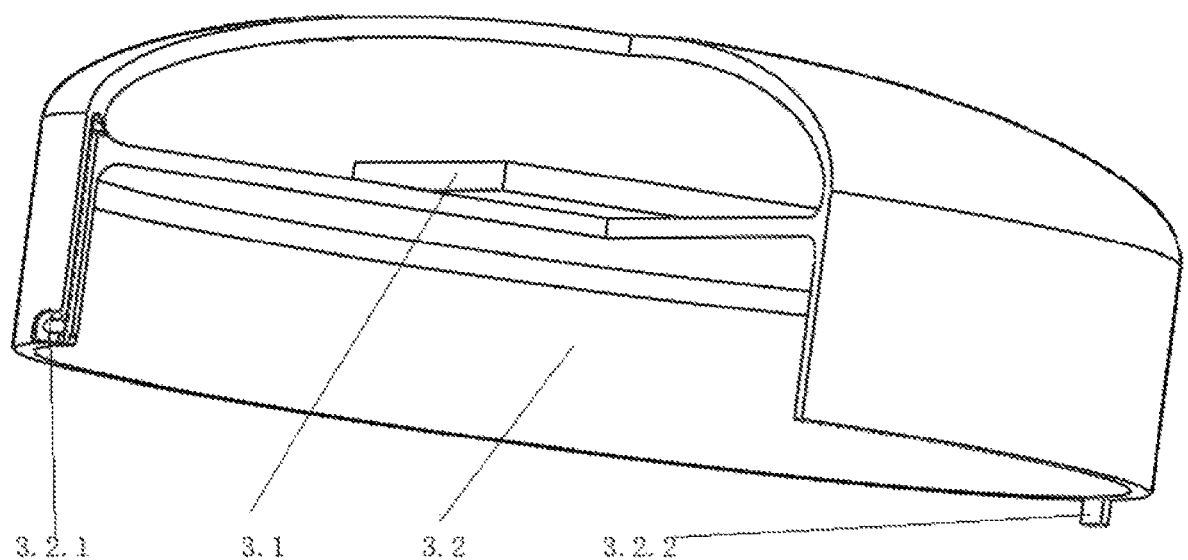
FIG. 5 is a schematic diagram of the main body outer lid to the present invention.
Figure 6:
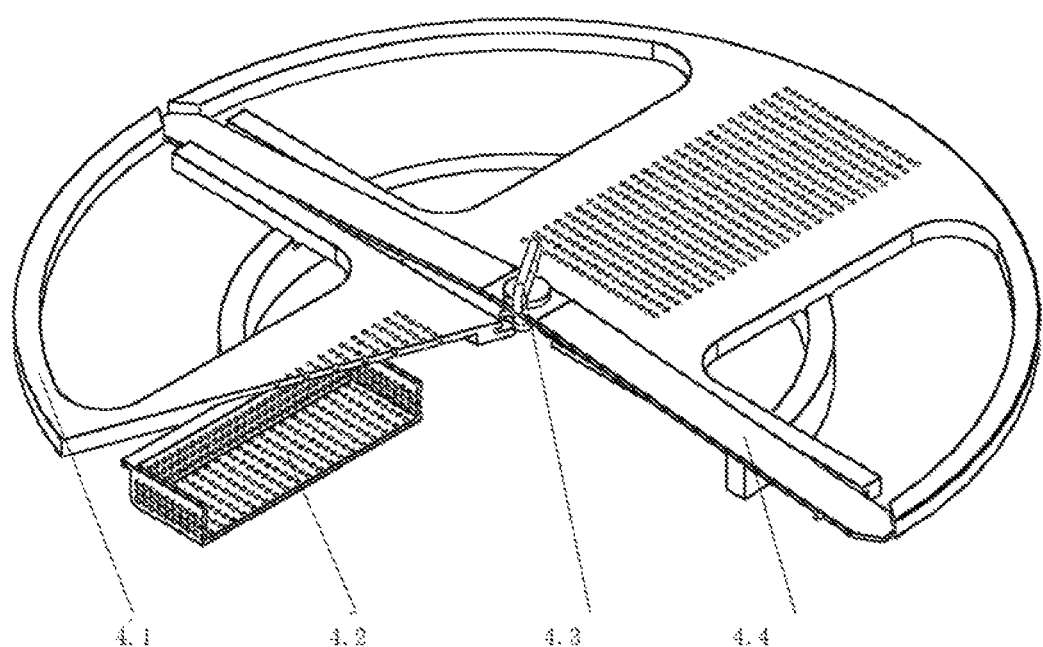
FIG. 6 is a schematic diagram of the stabilizer storage mechanism to the present invention.
Figure 7:
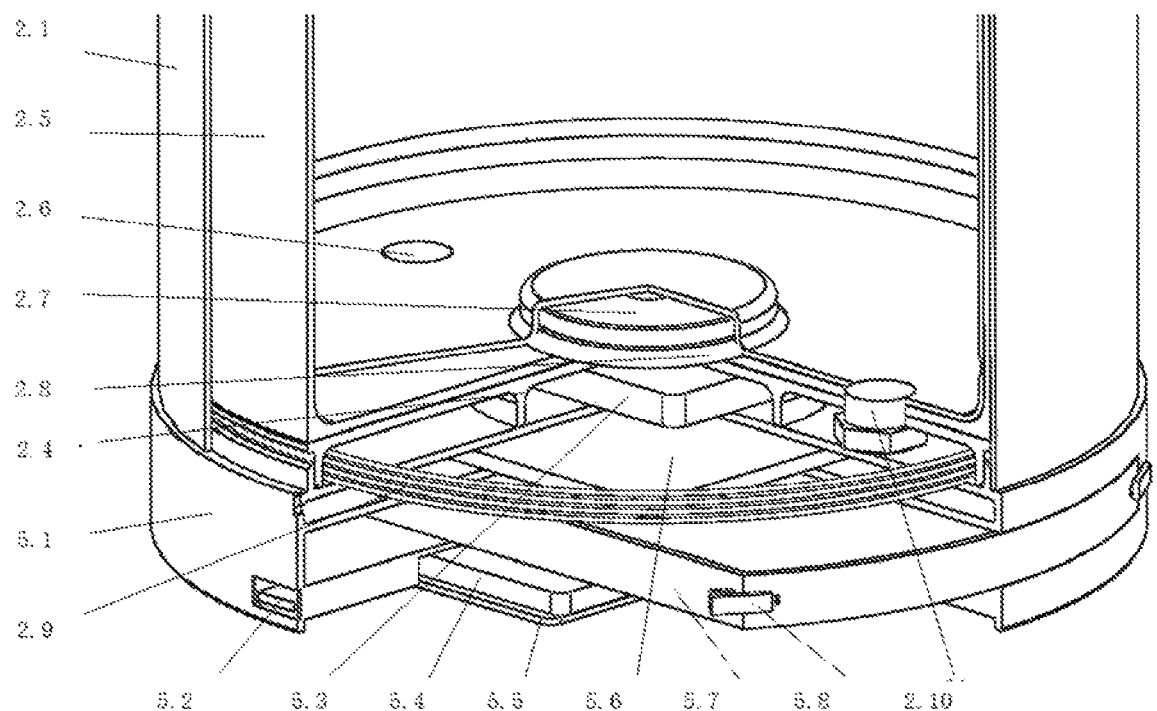
FIG. 7 is a schematic diagram of the main body pedestal to the present invention.
Figure 8:
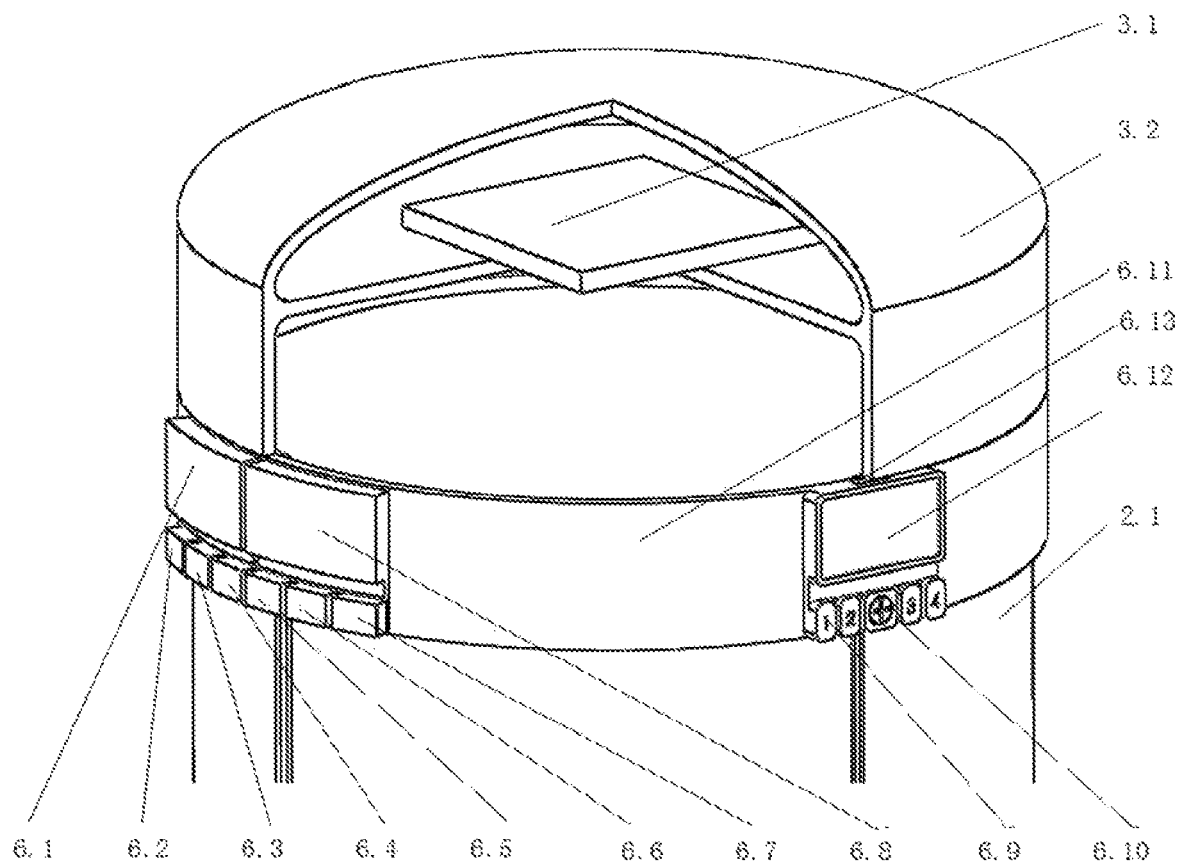
FIG. 8 is a schematic diagram of the control display to the present invention.
Figure 9:
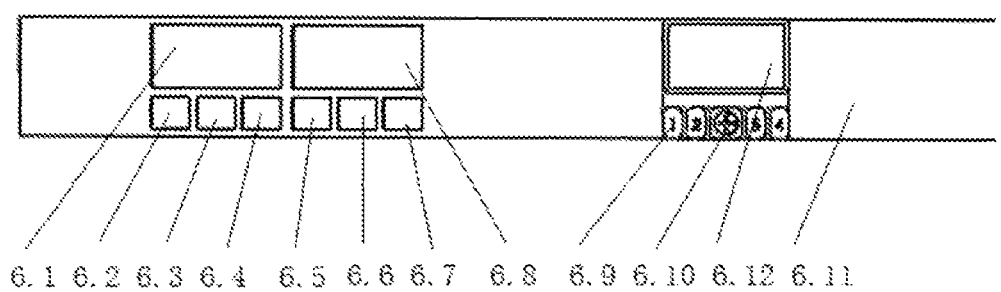
FIG. 9 is a schematic diagram of the plastic ring's deployable structure to the present invention.
Figure 10:
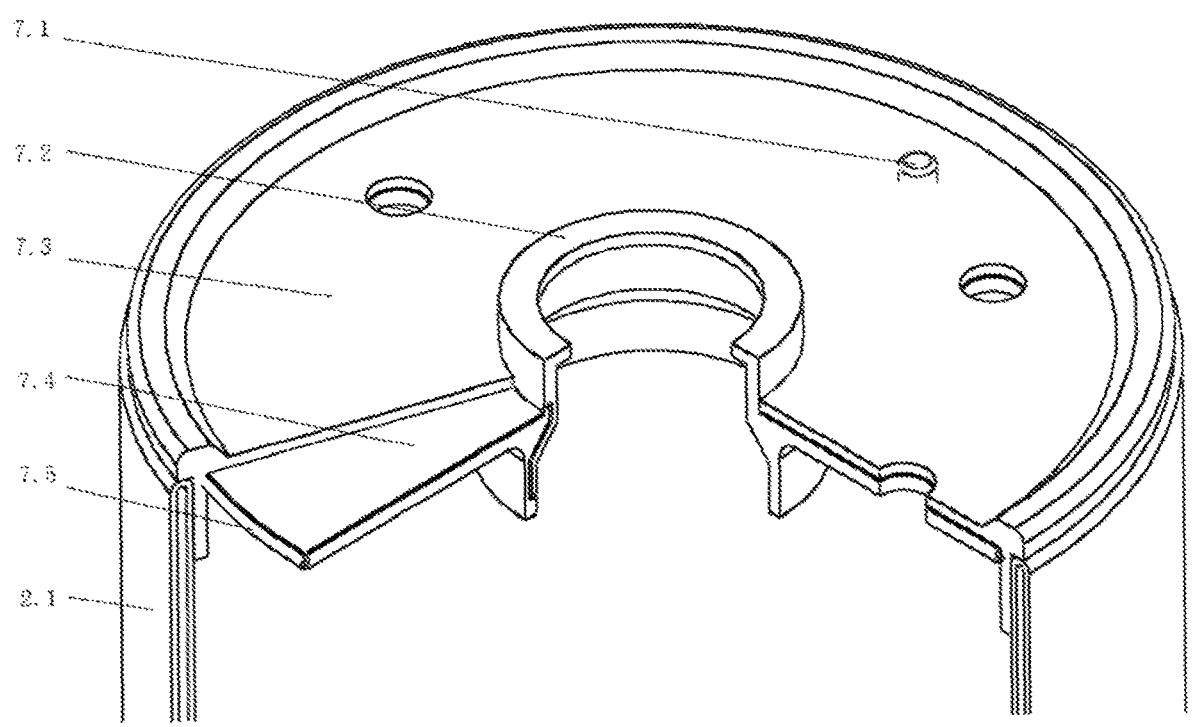
FIG. 10 is a schematic diagram of the main body inner lid mechanism to the present invention.
Figure 11:
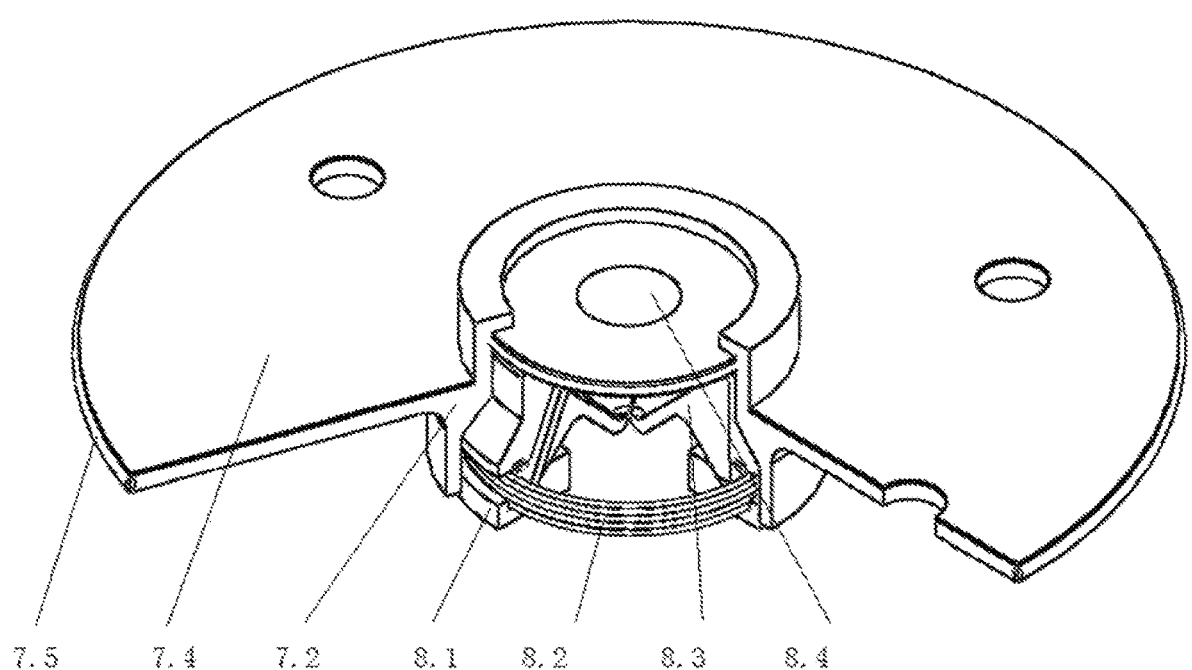
FIG. 11 is a schematic diagram of the neutralizer storage and releasing mechanism to the present invention.
Figure 12:
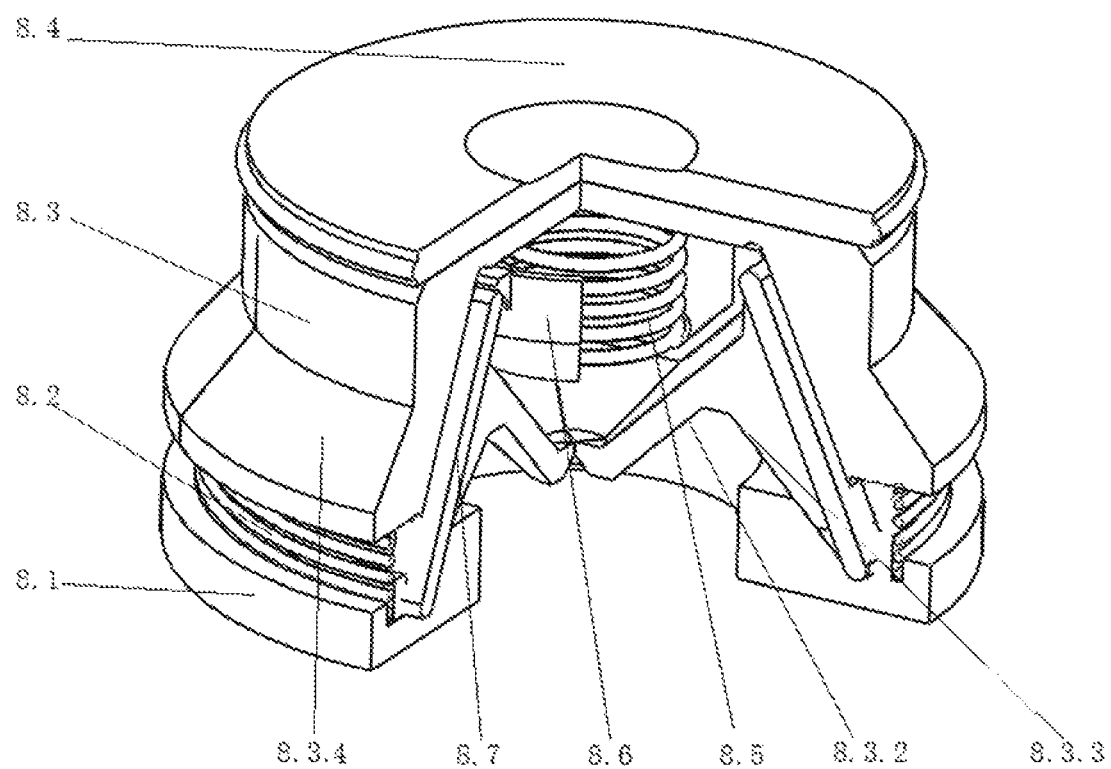
FIG. 12 is a broken out section view schematic diagram of the neutralizer storage and releasing mechanism to the present invention.
Figure 13:
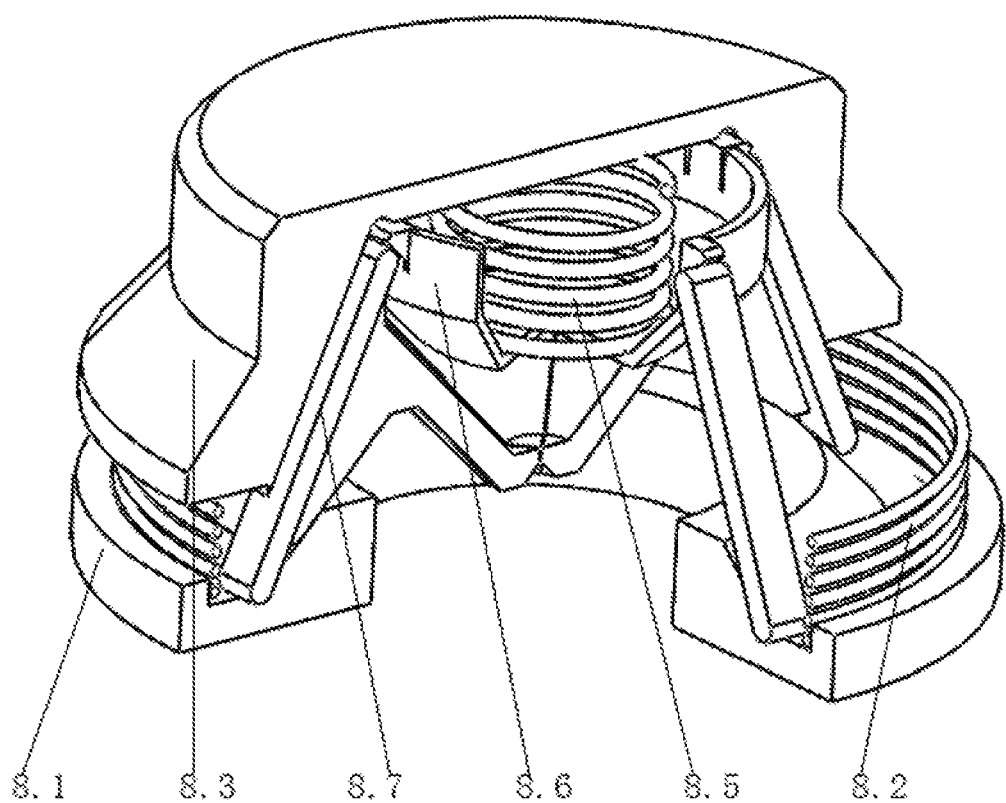
FIG. 13 is an interior schematic diagram of the neutralizer storage and releasing mechanism to the present invention.
Figure 14:
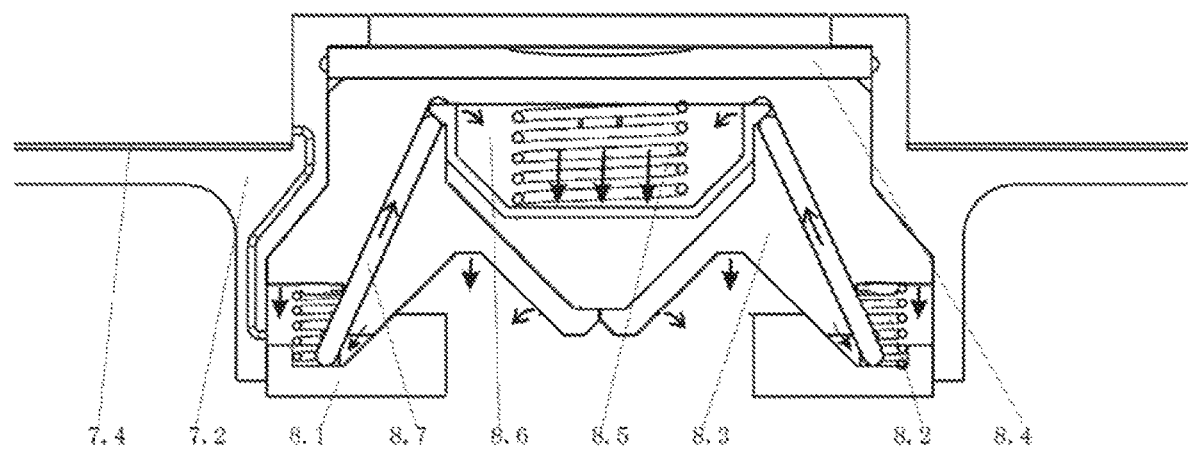
FIG. 14 is a working principle diagram of the neutralizer storage and releasing mechanism to the present invention.
Figure 15:
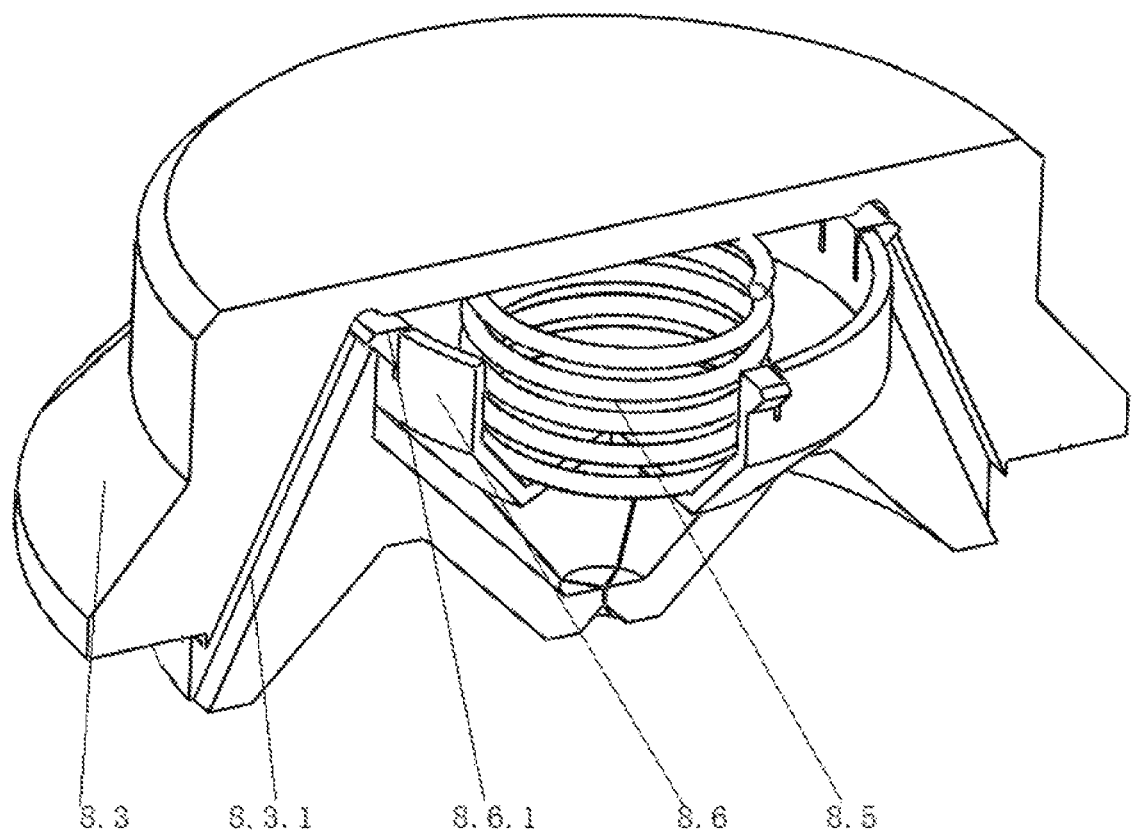
FIG. 15 is a connection schematic diagram of the rubber block and the neutralizer release lid to the present invention.
Figure 16:
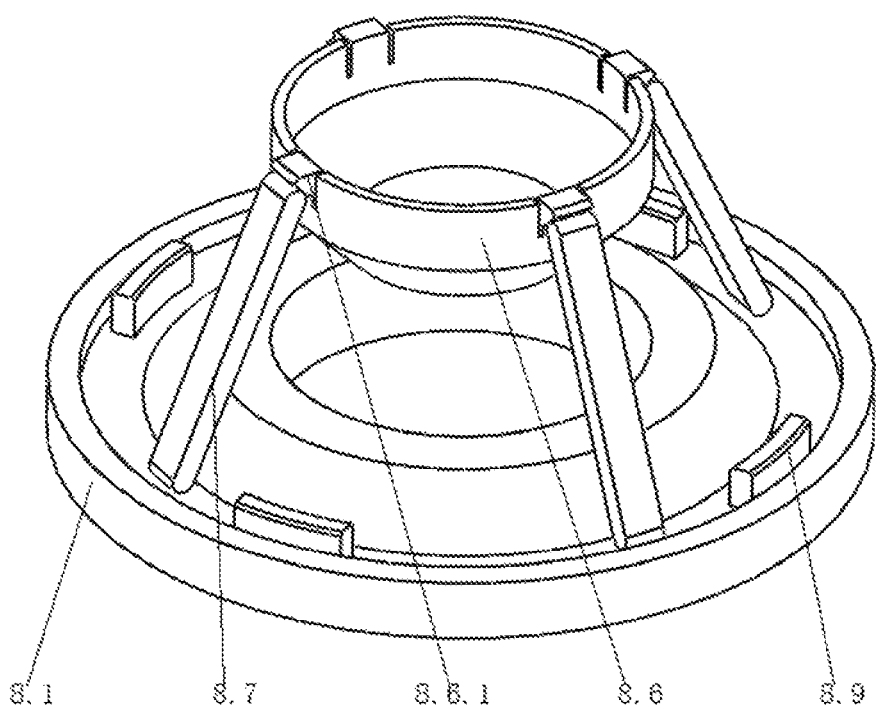
FIG. 16 is a connection schematic diagram of the rubber mounting pedestal and the neutralizer release lid to the present invention.
Figure 17:
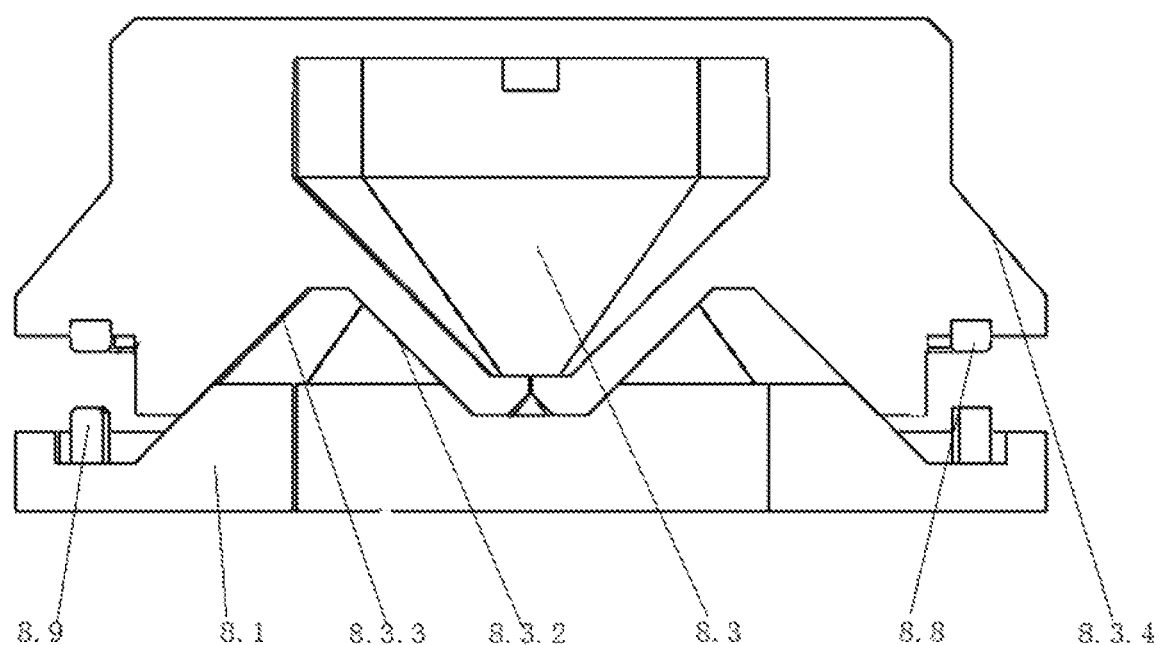
FIG. 17 is a connection schematic diagram of the rubber mounting pedestal and the rubber block to the present invention.
Figure 18:
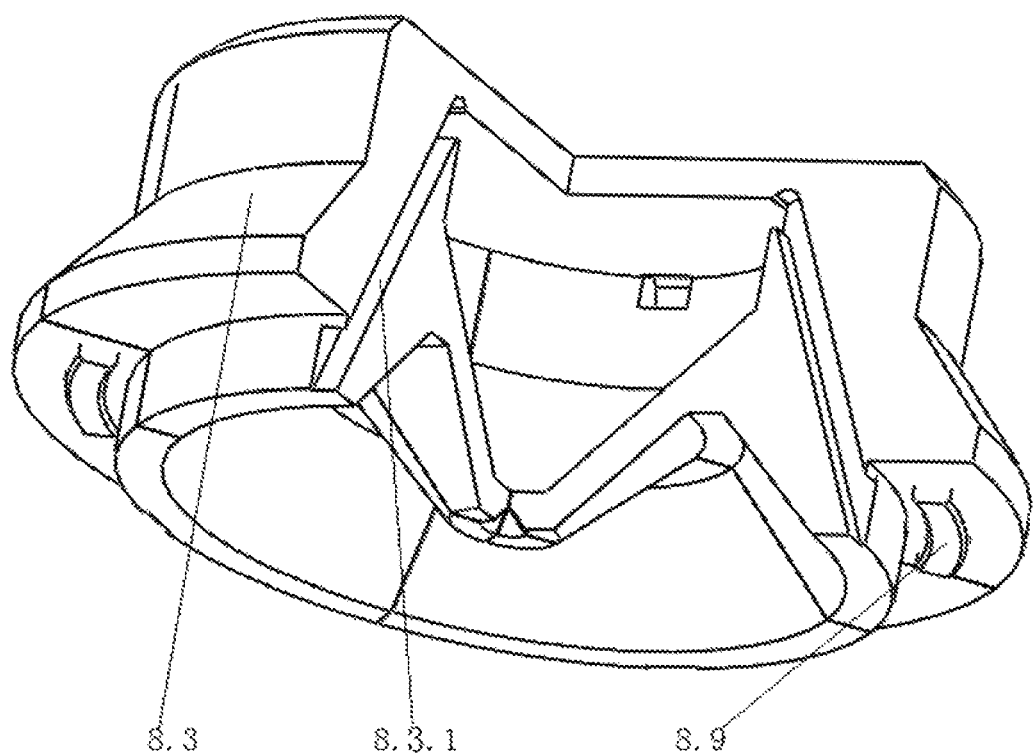
FIG. 18 is a schematic diagram of the rubber block of the neutralizer storage and releasing mechanism to the present invention.
Figure 19:
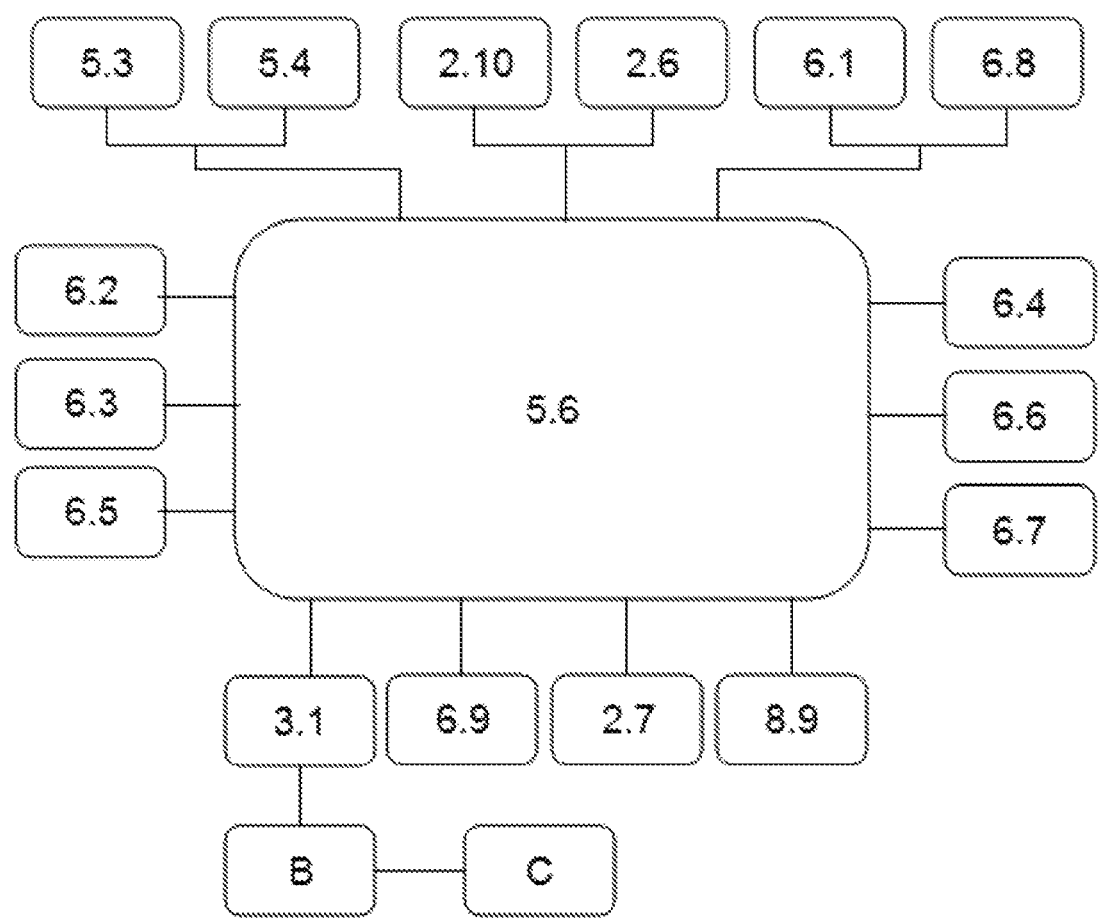
FIG. 19 is a control structure flow chart to the present invention.

Specific example combined with the drawings:

As shown in FIG. 1-19, a hazardous article handing and logistics information system for geological sciences and other purposes to the present invention is made up of three parts A. liquid hazardous article logistics container, B. Beidou Satellite Navigation System, C. remote control terminal. The liquid hazardous article logistics container A includes outer protective sleeve 1, liquid storage main body 2, main body outer lid 3, stabilizer storage mechanism 4. main body pedestal 5, control display 6, main body inner lid mechanism 7, neutralizer storage and releasing mechanism 8, outer lining 1.1, rubber bracket 1.2, Absorb vibration leaf spring 1.3, Absorb vibration spring 1.4, inner lining 1.5, inner tank 2.1, soft hose 2.2. shell 2.3, auxiliary mount for heat preservation filler 2.4, heat preservation filler 2.5, temperature sensor 2.6, semiconductor-refrigerating chips 2.7. auxiliary mounting chips for refrigerating chips 2.8, Absorb vibration spring 2.9, liquid level sensor 2.10, Beidou positioning and communication module 3.1, outer lid 3.2, stabilizer holder 4.1, stabilizer box 4.2, stabilizer locking ring 4.3, retainer plate of stabilizer holder 4.4, mounting pedestal 5.1, USB outlet 5.2, emergency power supply 5.3, main battery 5.4, battery lid 5.5, main control board 5.6, drawer box 5.7, drawer slide 5.8, temperature display 6.1, temperature up-regulated button 6.2, temperature down-regulated button 6.3. heat preservation button 6.4, main switch 6.5, refrigerating button 6.6, heating button 6.7, liquid volume display 6.86, code lock buttons 6.9, mechanical keyhole of the code lock 6.10, plastic ring 6.11, code display 6.12, code lock 6.13, safety pin of the inner lid 7.1, movable inner lid 7.2. fixed inner lid 7.3, gasket 7.4, seal ring 7.5, rubber mounting pedestal 8.1, return spring 8.2. rubber block 8.3, tablet 8.4, neutralizer release spring 8.5, neutralizer release lid 8.6, neutralizer release push rods 8.7, neutralizer release keepers 8.8, neutralizer release electromagnets 8.9: outer sleeve zipper 1.1.1, pinhole of outer lid 3.2.1, retaining ring of code lock 3.2.2, mounting slot of push rod 8.3.1, inner outward side 8.3.2, inner inclined tapered surface 8.3.3. outer inclined tapered surface 8.3.4, overhang mounting flange 8.6.1.

Outer protective sleeve 1 is consisted of outer lining 1.1, rubber bracket 1.2, Absorb vibration leaf spring 1.3, Absorb vibration spring 1.4 and inner lining 1.5. The outer sleeve 1 is wrapped up by the outer lining 1.1 with outer sleeve zipper 1.1.1 on it. Between outer lining 1.1 and inner lining 1.5, rubber bracket 1.2 is installed in the middle of the sleeve, with several slots in the circumferential direction and several pedestals at the bottom. Absorb vibration leaf springs 1.3 are distributed in the slots, while the Absorb vibration springs 1.4 are in the pedestal of rubber bracket 1.2.

Solutions stored in liquid storage main body 2 can be put into inner lining 1.5. The outer lining 1.1 is sealed by outer sleeve zipper 1.1.1 to fully protect solutions in liquid storage main body 2 and reduce vibration influence to it.

Liquid storage main body 2 includes inner tank 2.1, soft hose 2.2. shell 2.3, auxiliary mount for heat preservation filler 2.4, heat preservation filler 2.5. temperature sensor 2.6. semiconductor-refrigerating chips 2.7, auxiliary mounting chips for refrigerating chips 2.8. Absorb vibration spring 2.9, liquid level sensor 2.10. With USB holes in the inner surface, the soft hose 2.2, which is made from material that is bulletproof, stab-resistant and shockproof, enwraps the shell 2.3. The shell 2.3 enwrapping the inner tank 2.1 is made of high strength special steel. There are mounting slots and holes for the sensor and its wires in the middle of the inner tank 2.1's bottom. Made from corrosion resistant material, the inner tank 2.1 contains two layers. The gap between the two layers is filled with heat preservation filler 2.5. The auxiliary mount for heat preservation filler 2.4 is made of soft rubber and installed at the bottom of the inner tank 2.1 with threads. The Absorb vibration spring 2.9 locates between the inner tank 2.1 bottom and the mounting pedestal 5.1. The temperature sensor 2.6 and the liquid level sensor 2.10 are installed in the mounting holes at the bottom of the inner tank 2.1, sealed by sealing material and connected to the main control board 5.6 through wires. The semiconductor-refrigerating chips 2.7 are fixed in the mounting slot at the bottom of the inner tank 2.1, of which one side contacts to the outer surface of the inner tank bottom and the other side contacts to the auxiliary mounting chips for refrigerating chips 2.8, sealed by silicone and connected to the main control board 5.6 through wires.

Inner tank 2.1 will not be corroded by solutions because of the corrosion resistant material when solutions are stored in inner tank 2.1. Heat preservation filler 2.5 can provide a suitable storing environment with proper temperature for the solution. Shell 2.3 made from high strength special steel can protect the tank. The temperature sensor 2.6 and the liquid level sensor 2.10 respectively measures the temperature and volume of the solution stored in tank 2.1, and the data can be transferred to the main control board 5.6 though wires. The semiconductor-refrigerating chips 2.7 works in heating or refrigerating state to heat or cool the solution stored in inner tank 2.1. External axial impacts on inner tank 2.1 can be reduced by Absorb vibration spring 2.9.

Stabilizer storage mechanism 4 contains stabilizer holder 4.1, stabilizer box 4.2, stabilizer locking ring 4.3 and retainer plate of stabilizer holder 4.4. Stabilizer holder 4.1 is fixed in the mounting slot inside the bottom of inner tank 2.1, with flow hole, mounting slot of stabilizer box and fixed plate and mounting hole of locking ring on the upper and lower surfaces. There are flow holes on the surrounding surfaces and at the bottom of stabilizer box 4.2 which is installed in the mounting slot of stabilizer holder 4.1 by overhang flanges. Stabilizer locking ring 4.3 is fixed in the mounting holes in the middle of stabilizer holder 4.1 and retainer plate of stabilizer holder 4.4. Fixed plate of stabilizer holder 4.4 is installed in the mounting slot of stabilizer holder 4.1 with its overhang cylinders of fixed plate of stabilizer holder 4.4 fixed in the holder chute of stabilizer holder 4.1 from both sides and stabilizer locking ring 4.3 connected to stabilizer holder 4.1 in the middle.

Put solid stabilizer into stabilizer box 4.2, and then installed onto stabilizer holder 4.1 with a hook connected to stabilizer locking ring 4.3. Place stabilizer holder 4.1 in the mounting slots at the bottom of inner tank 2.1. Press stabilizer locking ring 4.3 to put the edge of stabilizer holder 4.1 into the bottom of inner tank 2.1 driven by fixed plate of stabilizer holder 4.4 so stabilizer holder 4.1 is fixed in inner tank 2.1. Rotate the stabilizer locking ring 4.3 to fix the retainer plate of stabilizer holder 4.4 onto the stabilizer holder 3.1 so that the stabilizer holder 4.1 is fixed in the tank 2.1. Solutions can contact with the solid stabilizer through the flow holes on stabilizer holder 4.1 and stabilizer box 4.2 after storage, so the chemical stability of the solution is ensured during transport.

The main body pedestal 5 consists of a mounting pedestal 5.1, a USB outlet 5.2, an emergency power supply 5.3, a main battery 5.4, a battery lid 5.5, a main control board 5.6 and a drawer box 5.7 and slide 5.8. The mounting pedestal 5.1 is installed at the bottom of the inner tank 2.1 with screw threads, with USB outlet 5.2 on one side. At the bottom of it is the battery mounting slot, through which the USB outlet 5.2 connects to the main control board 5.6. Between the auxiliary mount for heat preservation filler 2.4 and the mounting pedestal 5.1 is the Absorb vibration spring 2.9. The emergency power supply 5.3 is installed on the mounting pedestal 5.1, connecting to the main control board 5.6 through wires. The main battery 5.4 is installed in the bottom of the mounting pedestal 5.1 of the battery installation slot, in its lower surface mounted with a battery lid 5.5, and through the wire connecting the main control board 5.6. The main control board 5.6 is fixed in the upper of the pedestal 5.1. The drawer box 5.7 is fitted in the mounting slot in the middle of the mounting pedestal 5.1, while the drawer slide 5.8 is in the chute around the mounting pedestal 5.1 and the drawer box 5.7.

The hazardous article handing and logistics information system for geological sciences and other purposes is powered by the main battery 5.4. If necessary to change the main battery 5.4, the emergency power supply 5.3 can temporarily provide electricity. The main battery 5.4 and the emergency power supply 5.3 can be charged via USB outlet 5.2. Operations and controls of the hazardous article handing and logistics information system for geological sciences and other purposes is conducted by the main control board 5.6. Chemical or emergency battery can be stored in drawer box 5.7 storage. Drawer box 5.7 can be pulled out or locked with drawer slide 5.8.

The control display 6 covers a temperature display 6.1, a temperature up-regulated button 6.2, a temperature down-regulated button 6.3, a heat preservation button 6.4, a main switch 6.5, a refrigerating button 6.6, a heating button 6.7, a liquid volume display 6.8, code lock buttons 6.9, a mechanical keyhole of the code lock 6.10, a plastic ring 6.11, a code display 6.12, and a code lock 6.13. Wherein the plastic ring 6.11 is secured to the outside of the inner tank 2.1 at the upper portion of the outer periphery of the top portion of the soft hose 2.2 and shell 2.3. There is a pin shaft hole on the upper of the ring, connecting the outer lid 3.2 with the pin shaft, with wire holes on the connection. The code lock 6.13 is installed around the ring, and the temperature display 6.1, liquid volume display 6.8 as well as the code display 6.12 is on the outer edge of the plastic ring 6.11, connecting to the main control board 5.6 through wires. Beneath the outer edge of the plastic ring 6.11 are temperature up-regulated button 6.2, temperature down-regulated button 6.3, heat preservation button 6.4, main switch 6.5, refrigerating button 6.6, heating button 6.7 and code lock buttons 6.9, which connect to the main control board 5.6 through wires. The mechanical keyhole of the code lock 6.10 exists centrally under the code display 6.12.

Operating buttons for the liquid hazardous article logistics container A are installed on the control display 6 of the hazardous article handing and logistics information system for geological sciences and other purposes. The plastic ring

6.11 connects inner tank 2.1 and the outer lid 3.2. The ceiling and floor limit temperatures of solutions in inner tank 2.1 can be regulated by temperature up-regulated button 6.2 and temperature down-regulated button 6.3 and the setting temperature can be delivered to the main control board 5.6 through USB wires. During temperature regulation, the real time temperature is shown on the temperature display 6.1 under the control of main control board 5.6. Press heat preservation button 6.4, refrigerating button 6.5, and heating button 6.6, and the main control board 5.6 switches the operating mode of semiconductor-refrigerating chips 2.7. After press heat preservation button 6.4, the liquid temperature of the inner tank 2.1 is measured by temperature sensor 2.6 and then delivered to the main control board 5.6 through wires. When the temperature in inner tank 2.1 is lower than the floor limit temperature set by the temperature down-regulated button 6.3, semiconductor-refrigerating chips 2.7 will work in heating mode under the control of the main control board 5.6 to heat the solution in inner tank 2.1 until the temperature is higher than the lower limit; When the temperature in inner tank 2.1 is lower than the ceiling limit temperature set by the temperature up-regulated button 6.2, semiconductor-refrigerating chips 2.7 will work in refrigerating mode under the control of the main control board 5.6 to refrigerate the solution in inner tank 2.1 until the temperature is lower than the ceiling limit. After press the refrigerating button 6.6, semiconductor-refrigerating chips 2.7 will work in refrigerating mode under the control of the main control board 5.6 to refrigerate the solution in inner tank 2.1 until the temperature reaches the floor limit; and semiconductor-refrigerating chips 2.7 will work in heating mode under the control of the main control board 5.6 to heat the solution in inner tank 2.1 until the temperature reaches the ceiling limit after press the heating button 6.7. If the main switch 6.5 is pressed, relevant information will be delivered from main switch 6.5 to the main control board 5.6 through wires, and the main control board 5.6 can turn on or off the power supplier. Set password by code lock buttons 6.9; the information is delivered to the main control board 5.6 through wires and the set password is displayed on the code display 6.12. When it is necessary to open the lock, enter the password with code lock buttons 6.9 and deliver the information to the main control board 5.6, which will compare the set password with the input ones. If the input password is correct, the code lock is unlocked by the main control board 5.6 through wires. When the whole set of equipment is powered off, it can be unlocked through the mechanical keyhole of the code lock 6.10.

The main body inner lid mechanism 7 is made up of a safety pin of the inner lid 7.1, a movable inner lid 7.2, a fixed inner lid 7.3, a gasket 7.4 and a seal ring 7.5. The fixed inner lid 7.3 is installed inside the upper of the inner tank 2.1 by screw threads with three extraction solution holes and a safety locking hole on the top. The angular spacing between extraction solution holes are 60, 120 and 180 degrees respectively, with wire holes in the radial direction and two conductive rings inside its circumferential direction. The movable inner lid 7.2 fits inside the fixed one 7.3 with three extraction solution holes on the top. The angular spacing between extraction solution holes are 60, 120 and 180 degrees respectively. There is a mounting slot in the circumferential direction and a hollow mounting boss with tapered surface inside in the middle of the movable lid; there are wire holes on the boss as well. The safety pin 7.1 is installed in the locking hole of the fixed inner lid 7.3 and pressed against the upper surface of the gasket 7.4. The gasket 7.4 is made of high-elastic corrosion-resistant material and the upper is provided with three extraction solution holes corresponding to the holes on the movable inner lid 7.2. On the upper surface of the movable inner lid 7.2, it locates between the fixed 7.3 and the movable 7.2 lids. The seal ring 7.5 fits in the mounting slot in the circumferential direction of the movable lid 7.2.

When collecting the liquid, first get off safety pin of the inner lid 7.1, and then turn the cylindrical boss on movable inner lid 7.2 to make the liquid collecting mouths on movable inner lid 7.2 and fixed inner lid 7.3 meet so that one, two or three extraction solution holes is/are open for different needs. Without liquid collecting, turn the cylindrical boss on movable inner lid 7.2 to make the liquid collecting mouths on movable inner lid 7.2 and fixed inner lid 7.3 in different positions. Fix safety pin of the inner lid 7.1 into the locking hole of fixed inner lid 7.3, and press gasket 7.4 and movable inner lid 7.2. Fix the relative positions of movable inner lid 7.2 and fixed inner lid 7.3 to avoid movement.

The neutralizer storage and releasing mechanism 8 is composed of a rubber mounting pedestal 8.1, a return spring 8.2, a rubber block 8.3, a tablet 8.4, a neutralizer release spring 8.5, a neutralizer release lid 8.6, neutralizer release push rods 8.7, neutralizer release keepers 8.8 and neutralizer release electromagnets 8.9. The rubber mounting pedestal 8.1 is threaded connected to the inner lower of the boss in the middle of the movable inner lid 7.2, and a through hole is formed in the middle. The upper thereof is provided with a tapered surface. The rubber block 8.3 are molded by rubber casting, with four neutralizer release electromagnets 8.9 evenly distributed on the upper surface and fits inside the mounting boss in the middle of the movable lid 7.2 with outer inclined tapered surface outside 8.3.4, inner outward 8.3.2 and inner inclined tapered surfaces 8.3.3 inside and space for neutralizer storage in the middle. The mounting slot for push rod 8.3.1 is evenly distributed in the circumferential direction under the block. It is the same with four gaps which divide the lower into four sections molded by rubber casting, with a neutralizer release keeper 8.8 in each section. The outer inward tapered side 8.3.4 contacts with the inner tapered surface in the middle of the movable inner lid 7.2, while the inner inclined tapered surface 8.3.3 contacts with the outer tapered surface of the rubber mounting pedestal 8.1. The return spring 8.2 is placed between the upper surface of the rubber mounting pedestal 8.1 and the lower surface of the rubber block 8.3. The tablet 8.4 sets between the movable inner lid 7.2 and the top of the rubber block 8.3, with mounting slot and elastic seal ring in the circumferential direction. Made from elastic material, the neutralizer release lid 8.6 is fitted in the space where the neutralizer is stored in the middle of the rubber block 8.3. On the upper of it evenly distribute four overhang flanges 8.6.1 which are installed on the top of the push rod mounting slot 8.3.1 of the rubber block 8.3. Inside the release lid 8.6, the neutralizer release spring 8.5 is between it and the rubber block 8.3. The neutralizer release push rods 8.7 are fixed in the push rod mounting slot 8.3.1 of the rubber block 8.3; its upper surface and lower surface respectively contact the tapered surface of neutralizer release lid's 8.6 overhang flange 8.6.1 and the bottom of the rubber mounting pedestal's 8.1 tapered surface.

In the assembling of neutralizer storage and releasing mechanism 8, enlarge the four sections of rubber block 8.3 with tools to make neutralizer release spring 8.5 and neutralizer release lid 8.6 entering into the storage space in the middle of rubber block 8.3. Then, put neutralizer release push rods 8.7 into push rod mounting slot 8.3.1 of rubber block 8.3. Set rubber block 8.3, tablet 8.4, neutralizer release spring 8.5, neutralizer release lid 8.6, neutralizer release push rod 8.7 and neutralizer release keeper 8.8 on the hollow mounting boss in the middle of movable inner lid 7.2. Lay rubber mounting pedestal 8.1 and return spring 8.2 under rubber block 8.3 with rubber mounting pedestal 8.1 and return spring 8.2 pressing rubber block 8.3 and tablet 8.4 axially. After assembling neutralizer storage and releasing mechanism 8 and before storing solutions in inner tank 2.1, open inner outward tapered surface 8.3.2 at the bottom of rubber block 8.3 with rod, move neutralizer release lid 8.6 upward, and press neutralizer release spring 8.5 until overhang mounting flange 8.6.1 of neutralizer release lid 8.6 fixed into the top of push rod mounting slot of rubber block 8.3. Open inner outward tapered surface 8.3.2 at the bottom of rubber block 8.3 with the funnel and pour the granular neutralizer into the central of rubber block 8.3 working as the neutralizer storage space. Removing the funnel, outer inclined tapered surface 8.3.4 of rubber block 8.3 and the inner tapered surface of movable inner lid 7.2 are compacted because of the elasticity of return spring 8.2, making rubber block 8.3 contracted. When rubber block 8.3 moves upward, its inner inclined tapered surface 8.3.3 moves relatively against the tapered surface of inner pedestal 8.1. The four sub-blocks of rubber block 8.3 contract inward, making the gaps between the sub-blocks dosed so that the neutralizer is sealed in the storage space. In case of emergency, the remote control terminal C will send messages to the main control board 5.6 so that neutralizer release electromagnets 8.9 start to work under the control of main control board 5.6 through wires—neutralizer release electromagnets 8.9 attract neutralizer release keeper 8.8 with magnetic force to move rubber block 8.3 downward and compress return spring 8.2. Inner inclined tapered surface 8.3.3 of rubber block 8.3 and the outer tapered surface of rubber mounting pedestal 8.1 are compressed. Outer inclined tapered surface 8.3.4 of rubber block 8.3 and the inner tapered surface in the middle of movable inner lid 7.2 move against each other relatively, making rubber block 7.3 relax. The four sub-blocks of rubber block 7.3 expand, making the gaps between the four sub-blocks of rubber block 7.3 enlarged. Meanwhile, four neutralizer release push rods 8.7 push four overhang mounting flanges 8.6.1 on the edge of neutralizer release lid 8.6. Neutralizer release lid 8.6 pops out and moves down to the neutralizer storage space within rubber block 8.3 under the function of neutralizer release spring 8.5. Therefore, the neutralizer enters into inner tank 2.1 through the gaps in rubber block 8.3 and mixed with the solutions in inner tank 2.1 to inactivate the solution, which can also be achieved by press tablet 8.4 manually.

The main body outer lid 3 consists of the Beidou positioning and communication module 3.1 and the outer lid 3.2. The outer lid 3.2 is installed on the top of plastic ring 6.11 through pin shaft, with pinholes 3.2.1 and wire holes on the one side, and buckle of code lock 3.2.2 on the other side. Beidou positioning and communication module 3.1 sets inside the outer lid 3.2 and connects the main control board 5.6 through wires.

The outer lid 3.2 is for the installation of Beidou module 3.1 and can prevent outside particles entering. Beidou positioning and communication module 3.1 use its own satellite navigation system to determine its own position and send information including the position of liquid hazardous article logistics container A, liquid temperature and volume of the solution to remote control terminal C via Beidou Satellite Navigation System B by message communication.

It can also receive messages sent by the remote control terminal C and transfer to the main control board 5.6.

When using the hazardous article handing and logistics information system for geological sciences and other purposes to the present invention, the remote control terminal C send control messages to the liquid hazardous article logistics container A via Beidou Satellite Navigation System B. And the liquid hazardous article logistics container A send messages including liquid temperature, volume and position of the stored solution to the remote control terminal C via Beidou Satellite Navigation System B to monitor the logistics of various liquid hazardous articles. In case of emergency, the remote control terminal C can control the liquid hazardous article logistics container A to release stabilizers or neutralizers to neutralize the solutions and avoid unnecessary harms caused by leakage from the liquid hazardous article logistics container A.

We claim:

1. A hazardous article handling and logistics information system, comprising: a liquid hazardous article logistics container, a positioning and communication module using Beidou Satellite Navigation System and a remote control terminal, wherein the liquid hazardous article logistics container comprises an outer protective sleeve, a liquid storage main body, a main body outer lid, a stabilizer storage mechanism, a main body pedestal, a control display, a main body inner lid mechanism and a neutralizer storage and releasing mechanism, wherein the outer protective sleeve comprises an outer lining, rubber brackets, shock absorbing spring plates, shock absorbing springs and an inner lining, wherein the outer sleeve is wrapped up by the outer lining with zippers, wherein between the outer and inner linings, the rubber brackets are installed in the middle of the sleeve, with several slots in the circumferential direction and several pedestals at the bottom, and wherein the shock absorbing spring plates are evenly distributed in the slots, while the shock absorbing springs are in the pedestal;

wherein the liquid storage main body comprises an inner tank, a soft hose, a shell, an auxiliary mount for heat preservation filler, heat preservation fillers, a temperature sensor, semiconductor-refrigerating chips, auxiliary mounting chips for refrigerating chips, an shock absorbing spring and a liquid level sensor, wherein with USB holes in the inner surface, the soft hose, which is made of a material that is bulletproof, stab-resistant and shockproof, enwraps the shell, wherein the shell enwrapping the inner tank is made of high strength special steel, wherein there are mounting slots and holes for the sensor and its wires at the middle bottom of the inner tank, wherein the inner tank is made of a corrosion resistant material and comprises two layers, wherein the gap between the two layers is filled with a thermal insulation filler, wherein an auxiliary mounting seat for the thermal insulation filler is made of soft rubber and thread fastened to the bottom of the tank, wherein the shock absorbing spring is located between the tank bottom and the mounting pedestal, wherein the temperature sensor and the liquid level sensor are installed in the mounting holes at the bottom of the inner tank, sealed by sealing material and connected to the main control board through wires, wherein the semiconductor-refrigerating chips are fixed in the mounting slot at the bottom of the inner tank, of which one side contacts to the outer surface of the inner tank bottom and the other side contacts to the auxiliary mounting chips for refrigerating chips, sealed by silicone and connected to the main control board through wires;

wherein the main body outer lid comprises the positioning and communication module and an outer lid, wherein the outer lid is installed on the top of plastic ring through pin shaft, with pin and wire holes on the one side, and buckle of code lock on the other side, and wherein the positioning and communication module sets inside the outer lid and connects the main control board through wires;

wherein the stabilizer storage mechanism comprisess a stabilizer holder, a stabilizer box, a stabilizer locking ring and a fixed plate of stabilizer holder, wherein the stabilizer holder is fixed in the mounting slot inside the inner tank bottom, with flow hole, mounting slot of stabilizer box and fixed plate and mounting hole of locking ring on the upper and lower surfaces, wherein there are flow holes on the surrounding surfaces and at the bottom of the stabilizer box which is installed in the mounting slot of the holder by overhang flanges, wherein the locking ring is fixed in the mounting holes in the middle of the holder and the fixed plate, and wherein the stabilizer holder fixed plate is installed in the mounting slot with its overhang cylinders fixed in the holder chute from both sides and the locking ring connected to the holder in the middle;

wherein the main body pedestal comprises a mounting pedestal, a USB outlet, an emergency power supply, a main battery, a battery lid, a main control board and a drawer box and slide, wherein the mounting pedestal is installed at the bottom of the tank with screw threads, with USB outlet on one side, wherein at the bottom of it is the battery mounting slot, through which the USB outlet connects to the main control board, wherein between the auxiliary mount for the thermal insulation filler and the mounting pedestal is the shock absorbing spring, wherein the emergency power supply is installed on the mounting pedestal, connecting to the main control board through wires, wherein the main battery is installed in the bottom of the mounting base of the battery installation slot, in its lower surface mounted with a battery cover, and through the wire connecting the main control board, wherein the main control board is fixed in the upper of the pedestal, and wherein the drawer box is fitted in the mounting slot in the middle of the mounting pedestal, while the drawer slide is in the chute around the mounting pedestal and the drawer box;

wherein the control display comprises a temperature display, a temperature up-regulated button, a temperature down-regulated button, a heat preservation button, a main switch, a refrigerating button, a heating button, a liquid volume display, code lock buttons, a mechanical keyhole of the code lock, a plastic ring, a code display and a code lock, wherein the plastic ring is secured to the outside of the inner tank at the upper portion of the outer periphery of the top portion of the soft hose, wherein there is a pin shaft hole on the upper of the ring, connecting the outer lid with the pin shaft, with wire holes on the connection, wherein the mechanical lock is installed around the ring, and the temperature display, liquid volume display as well as the code display is on the outer edge of the plastic ring, connecting to the main control board through wires, wherein beneath the outer edge of the plastic ring are temperature up-regulated button, temperature down-regulated button, heat preservation button, main switch, refrigerating button, heating button and code lock buttons, which connect to the main control board through wires, and wherein mechanical keyhole of the code lock exists centrally under the code display;

wherein the main body inner lid mechanism comprises a safety pin of the inner lid, a movable inner lid, a fixed inner lid, a gasket and a seal ring, wherein the fixed inner lid is installed inside the upper of the inner tank by screw threads with three extraction solution holes and a safety locking hole on the top, wherein the angular spacing between extraction solution holes are 60, 120 and 180 degrees respectively, with wire holes in the radial direction and two conductive rings inside its circumferential direction, wherein the movable inner lid fits inside the fixed one with three extraction solution holes on the top, wherein the angular spacing between extraction solution holes are 60, 120 and 180 degrees respectively, wherein there is a mounting slot in the circumferential direction and a hollow mounting boss with tapered surface inside in the middle of the movable lid, wherein there are wire holes on the boss as well, wherein the safety pin is installed in the locking hole of the fixed inner lid and pressed against the upper surface of the gasket, wherein the gasket is made of a high-elastic corrosion-resistant material and the upper is provided with three extraction solution holes corresponding to the holes on the movable inner lid, wherein the three extraction solution holes are located on the upper surface of the movable inner lid and between the fixed and the movable lids, and wherein seal ring fits in the mounting slot in the circumferential direction of the movable lid;

wherein the neutralizer storage and release mechanism comprises a rubber mounting pedestal, a return spring, a rubber block, a tablet, a neutralizer release spring, a neutralizer release lid, neutralizer release push rods, neutralizer release keepers and neutralizer release electromagnets, wherein the rubber mounting pedestal is thread connected to the inner lower of the boss in the middle of the movable inner lid, and a through hole is formed in the middle, wherein the upper part thereof is provided with a tapered surface, wherein the rubber block are molded by rubber casting, with four neutralizer release electromagnets evenly distributed on the upper surface and fits inside the mounting boss in the middle of the movable lid with outer inclined tapered surface outside, inner outward and inward inclined surface inside and space for neutralizer storage in the middle, wherein the mounting slot for push rod is evenly distributed in the circumferential direction under the block, wherein it is the same with four gaps which divide the lower into four sections molded by rubber casting, with a neutralizer release keeper in each section, wherein the outer inclined tapered surface contacts with the inner tapered surface in the middle of the movable inner lid, while the inner inclined tapered surface contacts with the outer tapered surface of the rubber mounting pedestal, wherein the return spring is placed between the upper surface of the rubber mounting pedestal and the lower surface of the rubber block, wherein the tablet sets between the movable inner lid and the top of the rubber block, with mounting slot and elastic seal ring in the circumferential direction, wherein the neutralizer release lid is made of an elastic material and fitted in the space where the neutralizer is stored in the middle of the rubber block, wherein on the upper of it evenly distribute four overhang flanges which are installed on the top of the push rod mounting slot of the rubber block, wherein inside the release lid, the neutralizer release spring is between it and the rubber block, wherein the neutralizer release push rods are fixed in the push rod mounting slot of the rubber block, and wherein its upper surface and lower surface contact the tapered surface of neutralizer release lid's overhang flange and the bottom of the rubber mounting pedestal's tapered surface.

* * * * *